United States Patent [19]

Dieckmann et al.

[11] Patent Number: 4,541,978
[45] Date of Patent: Sep. 17, 1985

[54] EXTRUSION-FILL METHOD OF PRODUCING AN ELASTOMERIC SPRING

[75] Inventors: J. Robert Dieckmann; Michael L. Lauber, both of Akron, Ohio; Mark R. Roodvoets, Spartanburg, S.C.

[73] Assignee: The Firestone Tire & Rubber Company, Akron, Ohio

[21] Appl. No.: 532,417

[22] Filed: Sep. 15, 1983

[51] Int. Cl.$^4$ .............................................. B29C 25/00
[52] U.S. Cl. .................................. 264/150; 264/134; 264/236; 264/262; 264/269; 264/326; 264/347; 425/44; 425/521; 426/284; 426/451; 426/514
[58] Field of Search ............... 264/236, 261, 262, 269, 264/326, 347, 134, 150; 425/44, 519, 521, 457; 426/284, 451, 514

[56] References Cited

U.S. PATENT DOCUMENTS

| | | | |
|---|---|---|---|
| 1,677,677 | 9/1928 | Irwin | 425/457 |
| 1,724,354 | 9/1927 | Kraft | 264/269 |
| 2,313,229 | 3/1943 | Dyrek | 426/284 |
| 3,259,682 | 7/1966 | Neville et al. | 264/328.11 |
| 3,407,104 | 10/1968 | Crandall | 264/261 |
| 3,419,889 | 12/1968 | Krugljachenko et al. | 425/457 |
| 3,476,852 | 11/1969 | Shattuck | 425/521 |
| 3,557,408 | 1/1971 | Fischer et al. | 425/457 |
| 3,780,151 | 12/1973 | Heirr | 264/347 |
| 3,892,398 | 7/1975 | Marsh | 267/63 R |
| 3,947,203 | 3/1976 | Rose | 264/323 |
| 4,287,930 | 9/1981 | McIntosh et al. | 264/326 |
| 4,324,754 | 4/1982 | Stephenson et al. | 264/328.11 |
| 4,338,070 | 7/1982 | Nava | 425/457 |
| 4,356,230 | 10/1982 | Emanuel et al. | 264/269 |

FOREIGN PATENT DOCUMENTS 1729137 11/1970 Fed. Rep. of Germany ...... 264/147

Primary Examiner—Jeffery Thurlow
Assistant Examiner—Patrick M. Dailey
Attorney, Agent, or Firm—Ronald Brietkrenz

[57] ABSTRACT

An elastomeric spring is formed by extruding a rubbery material into a reinforcing sleeve in a mold during relative motion between the mold and nozzle, and thereafter vulcanizing.

3 Claims, 15 Drawing Figures

EXTRUSION-FILL METHOD OF PRODUCING AN ELASTOMERIC SPRING

BACKGROUND OF THE INVENTION

Variable-rate compression springs for use in vehicle suspensions and comprising a rubbery body member surrounded by a fabric sleeve are disclosed in U.S. Pat. No. 3,892,398, issued July 1, 1975, to G. L. Marsh and assigned to the assignee of the present invention.

Conventionally, such springs have been produced by, for example, spirally winding an elastomer layer onto a mandrel to form the body, and then covering the exterior with a sheath of fabric-reinforced elastomer. Alternatively, after a rubber core is extruded, it may be mounted on a mandrel to receive a wound-on bias-cut fabric and outer cover, or it may later be assembled within a pre-prepared bias-fabric sleeve, before vulcanization in a mold. In order to improve quality, uniformity and productivity, the present process and apparatus have been designed.

SUMMARY OF THE INVENTION

Specifically, the invention is directed to producing a vulcanized rubber spring having a generally cylindrical body, an outer skin comprised of bias-laid cord material, and an axially extending central cylindrical opening, by extruding elastomeric body material into a cord-sleeve in place within the curing mold, capping the mold, and applying vulcanizing heat to the spring.

DESCRIPTION OF PREFERRED EMBODIMENT

Figure 1:
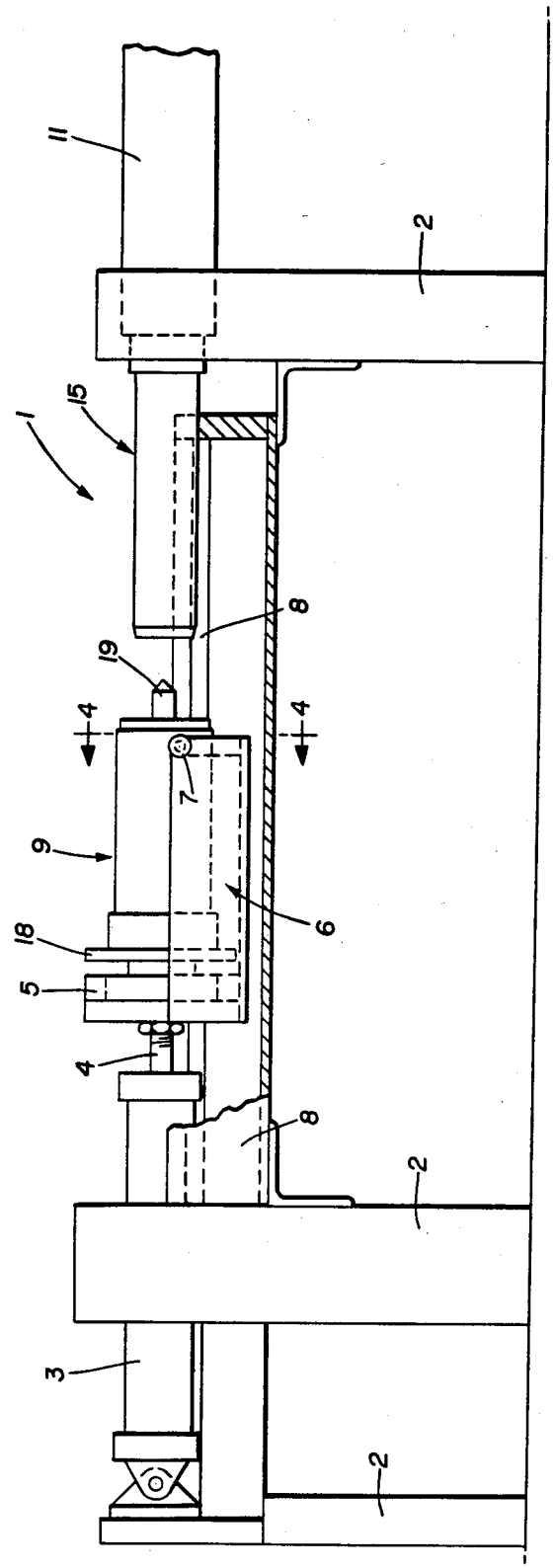
FIG. 1 is a side elevation, partially in section, showing the extrusion-fill portion of the apparatus.
Figure 4:
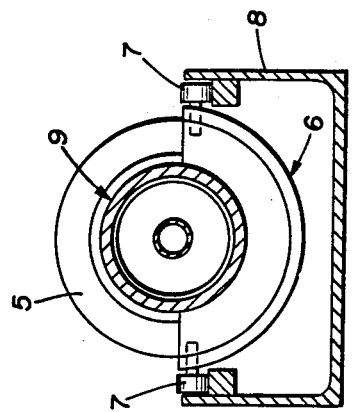
FIG. 4 is a view, taken along line 4—4 of FIG. 1 and showing the cradle supported on its track and carrying the mold.
Figure 3:
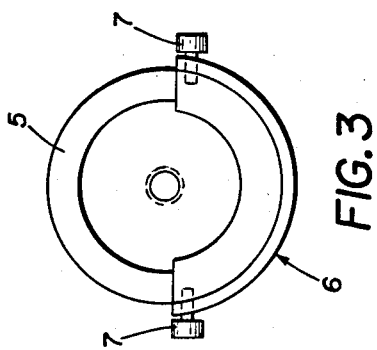
FIG. 3 is an end view of the cradle of FIG. 2.
Figure 2:
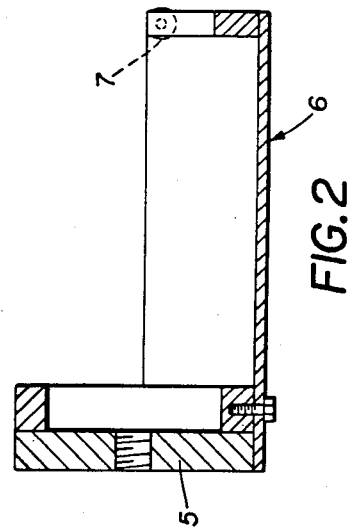
FIG. 2 is a side elevation, partially in section, of the support-cradle for carrying the mold.
Figure 5:
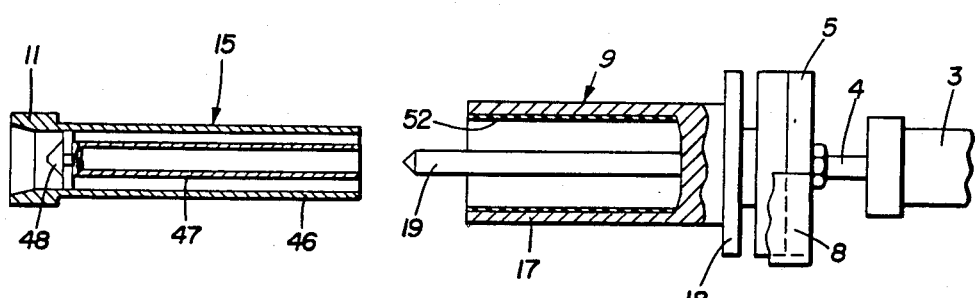
FIGS. 5-8 are side elevations, partially in section, showing somewhat schematically various stages in the extrusion-fill portion of the process.

In FIG. 1, a horizontal filling array is denoted by 1, with supports 2 carrying a pressure cylinder 3 whose piston rod 4 is connected to a ram 5. Attached to the ram is a cradle 6, the front of which carries support rollers 7 operating on track 8. The track extends between some of supports 2 and assures even travel of the cradle.

The cradle-ram combination is adapted to receive and move the mold 9 horizontally and coaxially with the nozzle 15 of extruder 16.

Figure 10:
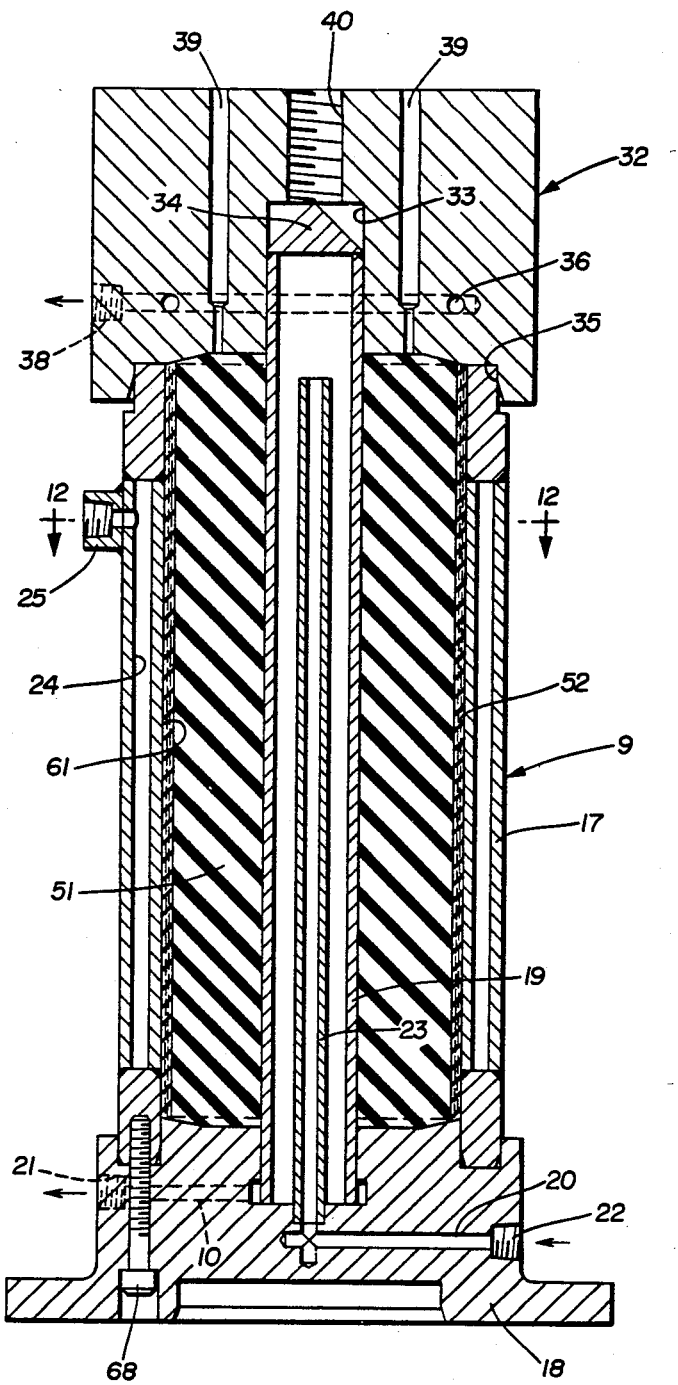
FIG. 10 is a longitudinal sectional view of the spring mold, filled and with the top cap in place.
Figure 13:
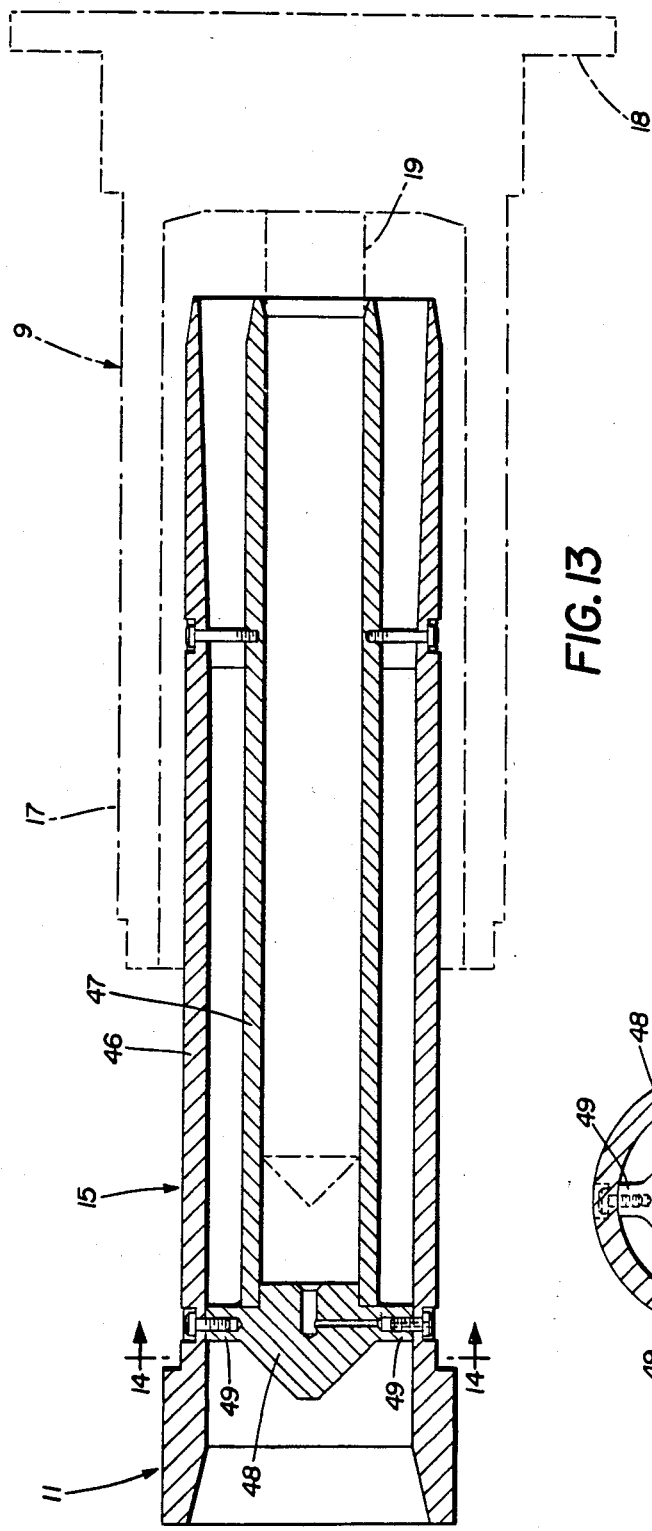
FIG. 13 is a longitudinal sectional view of the extruder nozzle, shown in relation to the mold.
Figure 14:
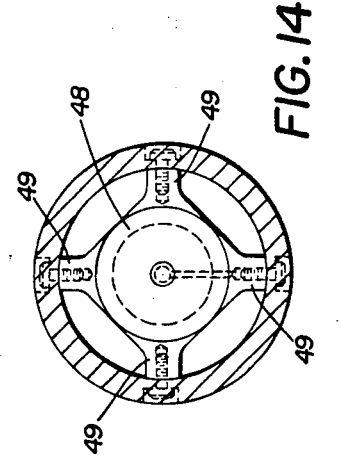
FIG. 14 is a view taken on line 14—14 of FIG. 13, and showing particularly the spider of the extruder.

The mold 9 is seen in different positions with respect to the extruder 11 in FIGS. 5 through 8, and again in FIG. 13. In FIG. 10, the mold 9 comprises a cylinder 17 joined to a bottom cap 18 from which extends a tubular pilot stud 19, the interior of which is connected directly through a passage 10 to fluid outlet 21; fluid inlet 22 leads through another passage 20 to a slim supply tube 23 for heating medium extending coaxially within stud 19. The top of stud 19 is closed and extends beyond the end of cylinder 17.

Figure 12:
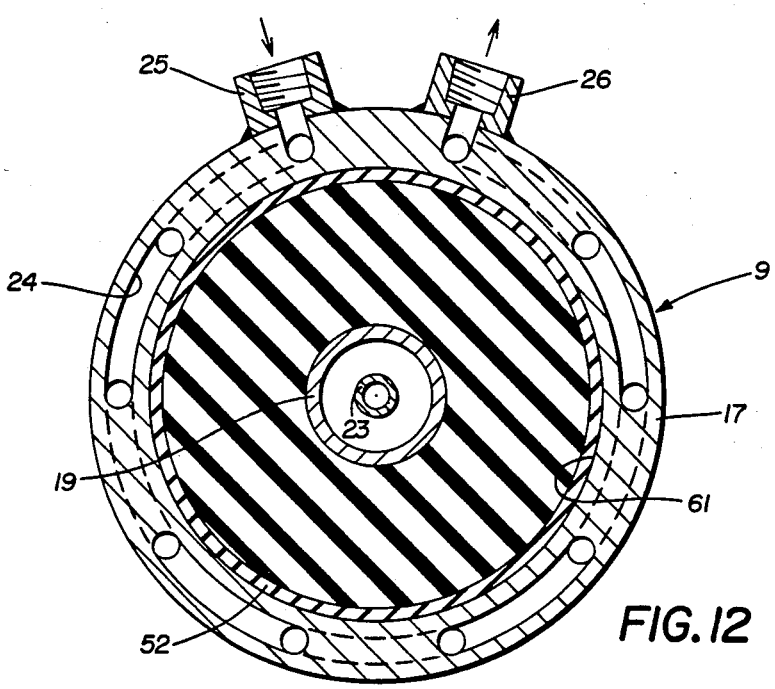
FIG. 12 is a view taken on line 12—12 of FIG. 10.

As best seen in FIGS. 10 and 12, within the wall of cylinder 17 there is a fluid passage 24 extending continuously from inlet port 25 to outlet port 25. Starting at inlet 25, the passage 24 is shown in FIG. 12 to extend axially away from the viewer, then circumferentially of the cylinder approximately 1/10 of its lower circumference, then axially toward the viewer, again circumferentially near the upper cylinder end, and so forth, until terminating at the outlet port 26. It will be clear that different but equally efficacious fluid paths may be used, both within the cylinder and in its bottom cap.

Figure 15:
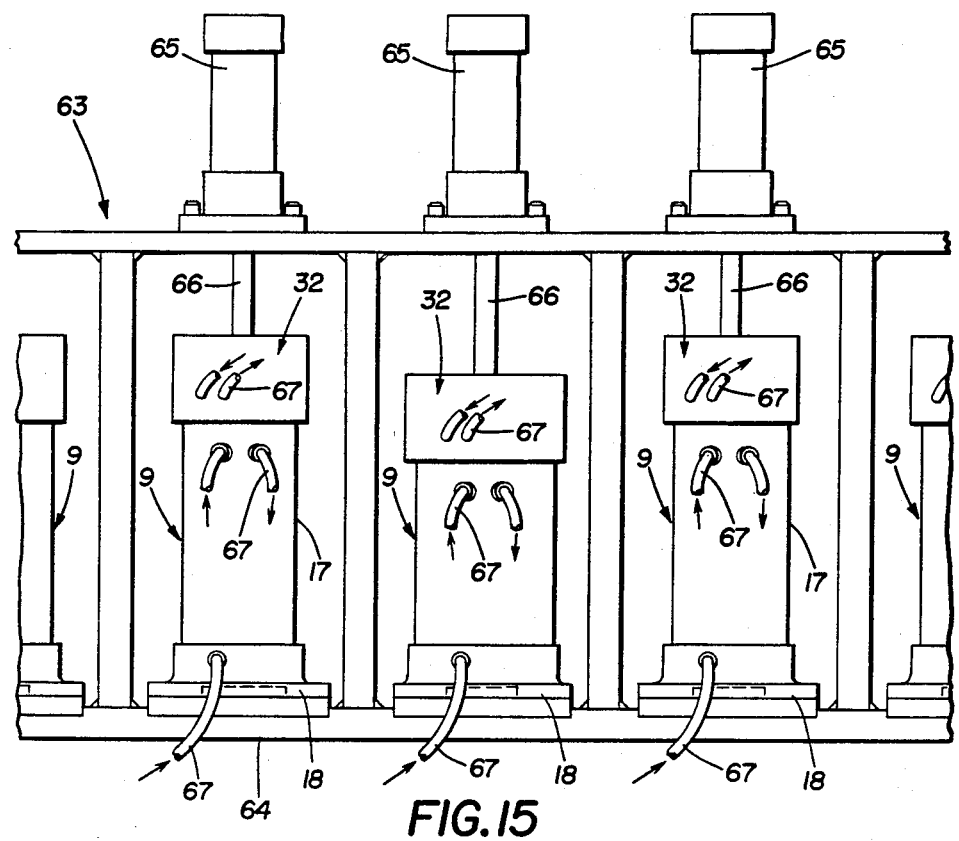
FIG. 15 is a side elevation showing a bank of filled molds in their vulcanizing stand.
Figure 11:
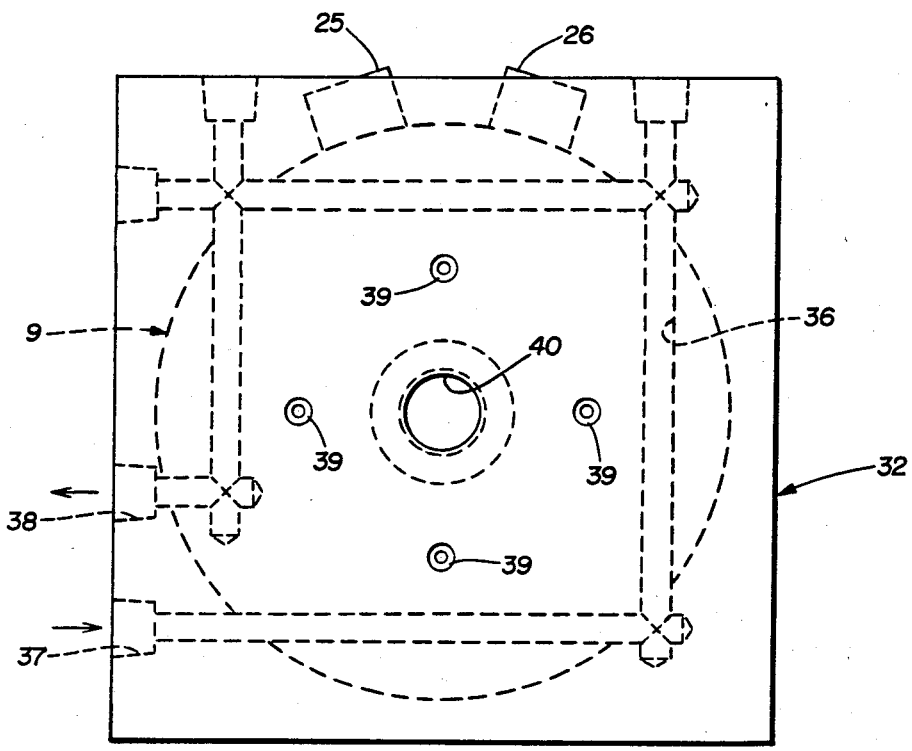
FIG. 11 is a plan view of the mold top cap.

Shown closing off the upper end of each mold 19 in FIGS. 10, 11 and 15 is a top cap 32, recessed as at 33 to receive the closed end 34 of tubular stud 19 in register; the cap 32 is further recessed as at 35 to receive the exterior of mold cylinder 17 in a snug fit. As best seen in FIG. 11, a fluid passage 36 extends around the interior of top cap 32 from inlet port 37 to outlet port 38.

Extending through the top cap are vent openings 39, as well as a threaded recess 40, to be explained hereafter.

Figure 6:
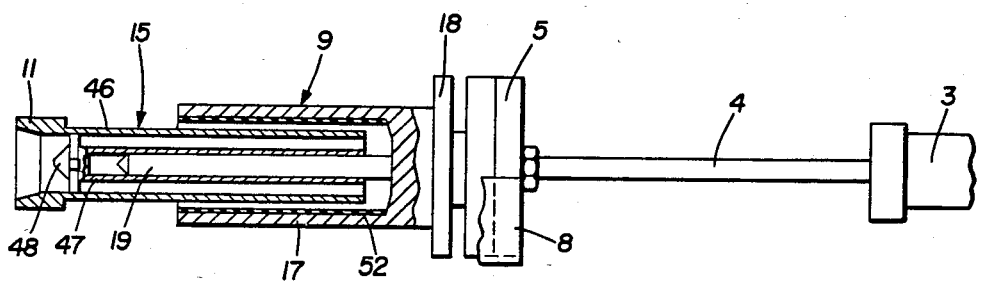
Figure 7:
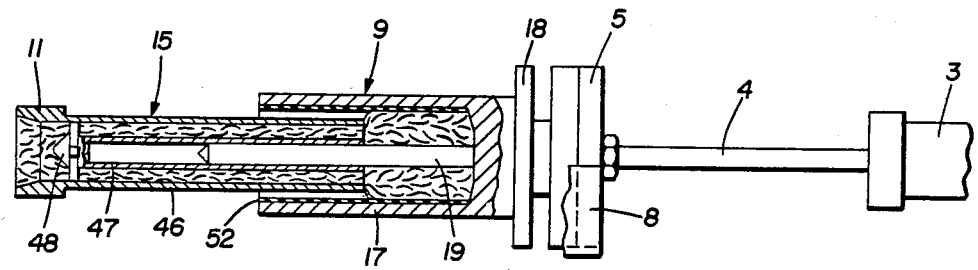
Figure 8:
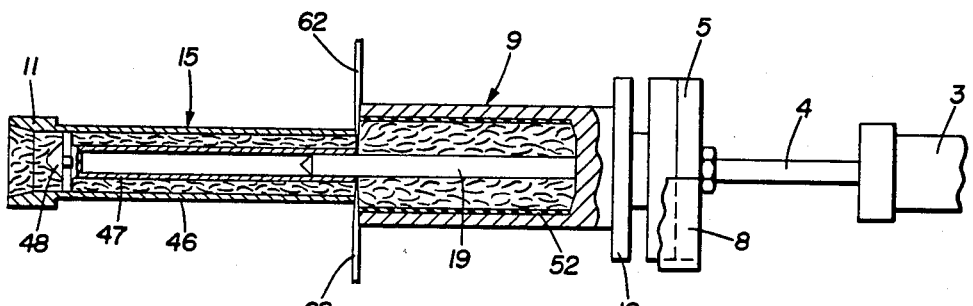

Turning to the extruder 11, as in FIG. 13, the extrusion nozzle 15 comprises longitudinal coaxial outer and inner tubes 46 and 47, respectively, extending coaxially of the mold 9 and its central stud 19. The outer tube 46 has a diameter permitting its easy passage within the cylinder 17. The inner tube 47 is carried within outer tube 46 by a spider 48 whose legs 49 are spaced circumferentially to provide passages for material flowing from the extruder 11 into nozzle 15. As seen in FIGS. 6, 7 and 13, the inside diameter of tube 47 is such as to create a sliding fit over the exterior of stud 19.

OPERATION

Figure 9:
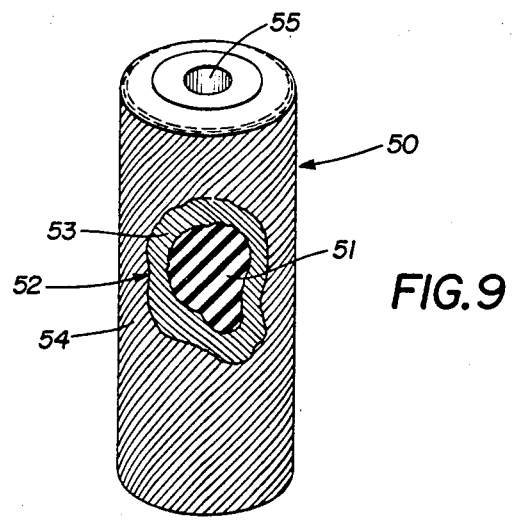
FIG. 9 is a perspective view, partially broken away and in section, of a completed elastomer spring produced according to the present invention.

The elastomeric spring to be produced according to the invention herein is shown in FIG. 9 to comprise a cylindrical elastomer body 15 encased in a sleeve 52 of rubberized cord layers 52 and 53 laid on opposite bias, and having a central opening 55.

As a first step, a sleeve 52, for example of rubberized bias-laid cord fabric, is placed inside mold 9 in engagement with its inner surface 61, and extending substantially throughout the length of cylinder 17.

Next, the piston rod 4 of fluid cylinder 3 is extended to bring the ram 5 forward, placing mold 9 and nozzle 15 into juxtaposition. At this point, as seen in FIG. 6, the sleeve 52 surrounds the outer tube 46, the inner tube 47 registers around stud 19, and the end of nozzle 15 is adjacent the bottom of the mold 9.

As elastomer is extruded through nozzle 15, it fills the mold cavity created by cylinder 17 and bottom cap 18, from the bottom. The pressure of the cylinder 3 on ram 5 is so selected that, as the extrusion-fill proceeds, it is overcome by the back-pressure of the filling process, and the nozzle and mold slowly separate axially. The pressure exerted by the extrudate is, of course, dependent upon, for example, the pressure within the extruder 11, the speed of extrusion, and the type of rubber being processed; the ram-pressure is thus, in each situation, adjusted to be slightly less, so as to cause the extrusion-fill pressure to barely overcome the ram-pressure. The approximate half-way point in this fill process is shown in FIG. 7.

It will be noted that the relative motion between mold 9 and filler nozzle 15 may be accomplished by holding the mold in place and causing longitudinal motion of the filler nozzle.

When the mold 9 is full, the extrusion is stopped, and knives 62 cut the extrudate just beyond the end of the mold 9.

The mold 9 is removed from the cradle 6 and ram 5 and placed vertically into the vulcanizing stand 63, as shown in FIG. 15. Provision is made within the frame 64 of stand 63 to support mold 9 on its bottom cap 18, while the pressure cylinder 65 through piston rod 66 threaded into recess 40 of the top cap 32, holds the top cap securely against the top of cylinder 17.

A vulcanizing medium such as steam or hot water is circulated through the bottom cap 18 from port 22 to port 21, through the cylinder wall 17 from port 25 to port 26, and through the top cap 32 from port 37 to port 38, all through hose connections 67. While cylinder 65 maintains sufficient pressure to keep the material within the closed mold in compression, vents 39 provide an escape path for expanded rubber volume which may be created in vulcanization.

After vulcanization at elevated temperatures, top cap 32 is raised with piston rod 66, and mold 9 is prepared for removal of the spring 50. The bottom cap 18 together with its pilot stud 19 is withdrawn from cylinder 17 after removing bolts 68. Since no pressure is exerted on the spring, beyond that mentioned above, simple lockpins may be used in place of bolts 68. Removal of the stud 19 from the spring leaves the required central opening 55, the existence of which also eases final removal of the spring 50 from within the cylinder 17.

What is claimed is:

1. In the method of producing an elastomeric spring having an outer reinforced sleeve, the steps of
    (1) providing a reinforced elastomer layer against the inner wall of a mold having a closed end;
    (2) placing the mold coaxially with and surrounding a filler means;
    (3) filling the mold from its closed end with elastomer while
    (4) causing the mold and filler means to separate progressively axially;
    (5) severing the fill at the open end of the mold;
    (6) capping the mold; and
    (7) vulcanizing the fill and layer.

2. In the method of producing a rubber spring having a cylindrical outer sleeve, the steps of
    (1) inserting a rubberized fabric sleeve against the inner cylindrical wall of a mold having a closed end;
    (2) moving the mold coaxially about the exterior of an extruder nozzle to surround it;
    (3) filling the mold from its closed end with extruded rubber while
    (4) causing the mold to separate axially from the nozzle;
    (5) severing the fill at the open end of the mold;
    (6) capping the open end of the mold; and
    (7) vulcanizing the elastomer and sleeve.

3. In the method of producing an elastomeric spring having a cylindrical outer sleeve, the steps of
    (1) inserting a cord-reinforced elastomer layer into a mold having a closed end and against its cylindrical inner wall;
    (2) moving the mold over an extrusion nozzle to a position surrounding it and with the nozzle near the closed end;
    (3) extruding elastomer into the mold to fill it from its closed end while
    (4) causing the mold to move axially away from the nozzle;
    (5) capping the mold; and
    (6) vulcanizing the extrudate and layer.

* * * * *